J. H. TRACY.
SYSTEM OF ELECTRICAL DISTRIBUTION.
APPLICATION FILED JAN. 10, 1908.
978,513.
Patented Dec. 13, 1910.
2 SHEETS—SHEET 1.
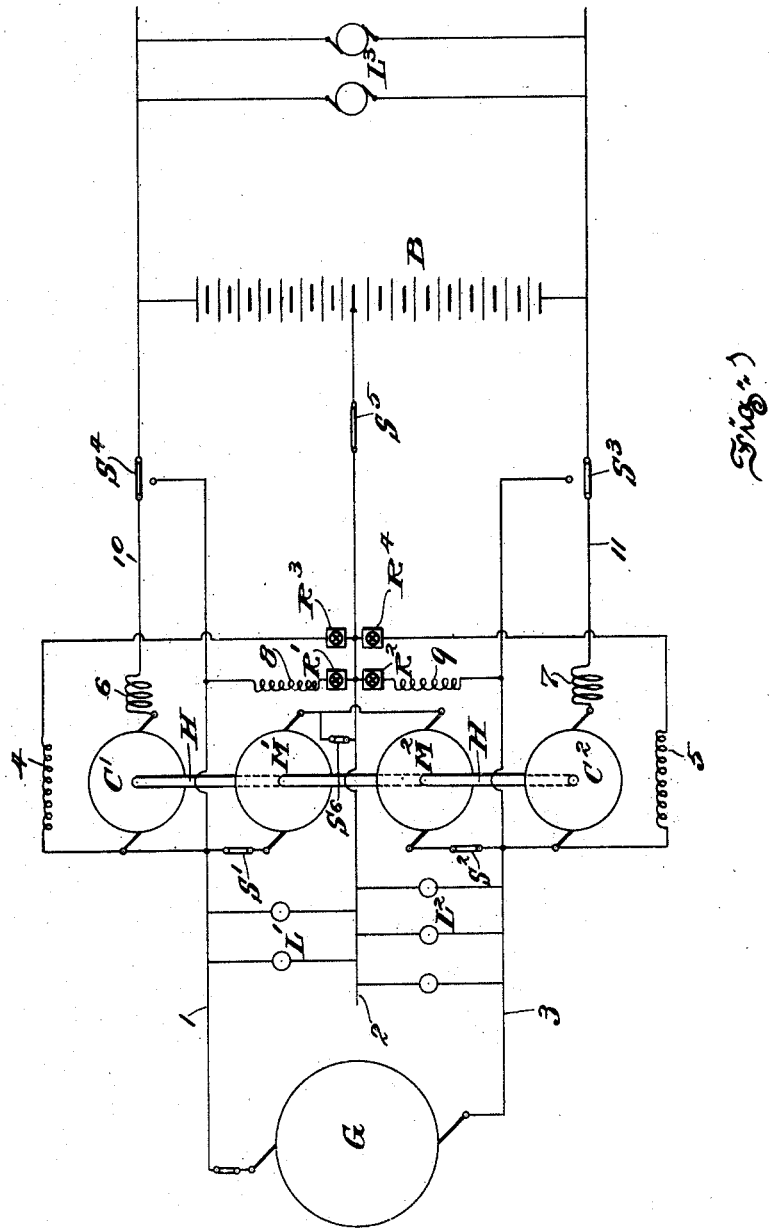
WITNESSES:
INVENTOR.
Joseph H. Tracy.
BY
ATTORNEY.

J. H. TRACY.
SYSTEM OF ELECTRICAL DISTRIBUTION.
APPLICATION FILED JAN. 10, 1908.
978,513.
Patented Dec. 13, 1910.
2 SHEETS—SHEET 2.
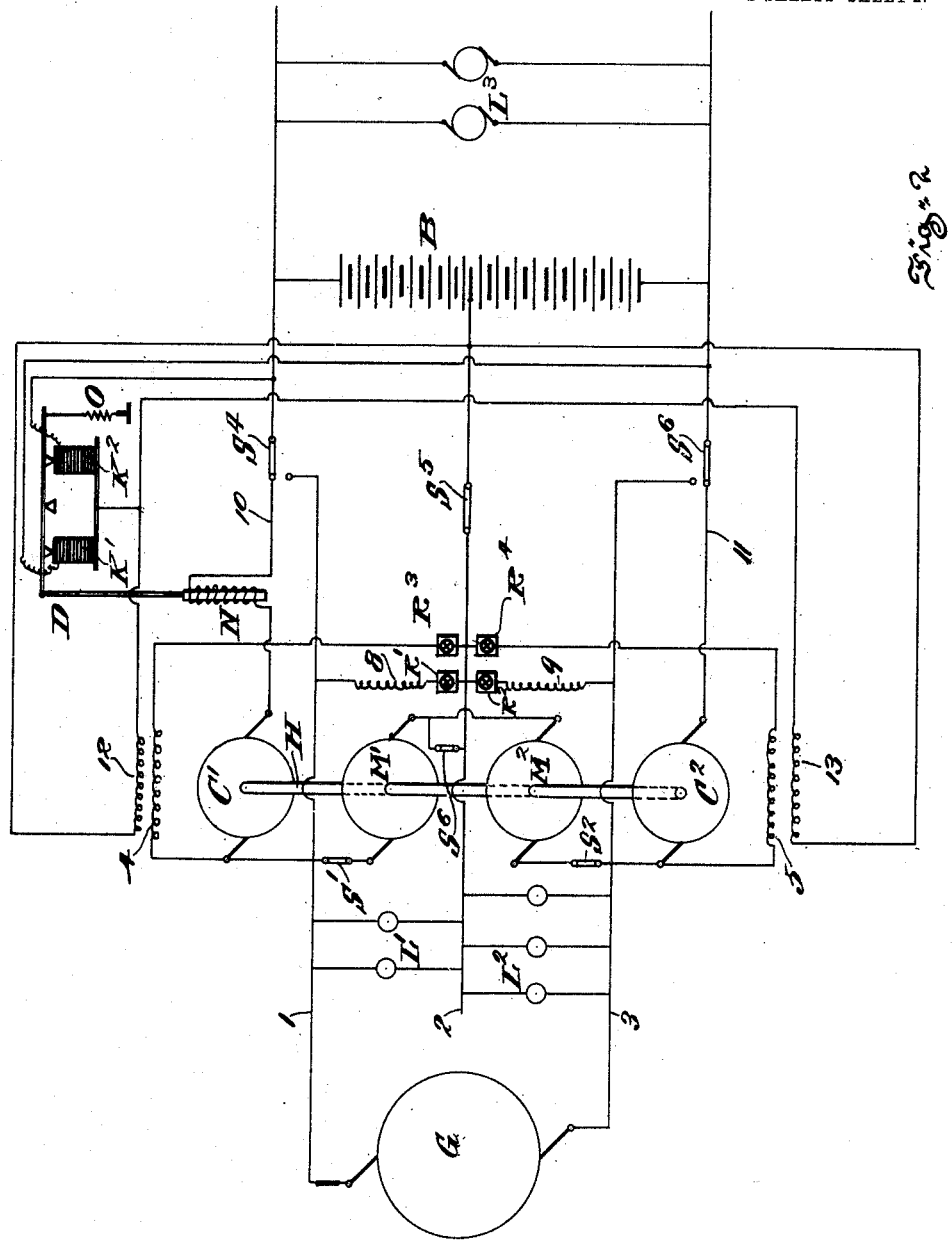
WITNESSES:
INVENTOR.
Joseph H. Tracy.
BY
Augustus B. Stoughton
ATTORNEY.

UNITED STATES PATENT OFFICE.

JOSEPH H. TRACY, OF PHILADELPHIA, PENNSYLVANIA.

SYSTEM OF ELECTRICAL DISTRIBUTION.

978,513.  Specification of Letters Patent.  Patented Dec. 13, 1910.

Application filed January 10, 1908. Serial No. 410,088.

*To all whom it may concern:*

Be it known that I, JOSEPH H. TRACY, a citizen of the United States, and resident of Philadelphia, in the county of Philadelphia and State of Pennsylvania, have invented a certain new and useful System of Electrical Distribution, of which the following is a specification.

My invention relates to systems of distribution in which a storage battery is operated in connection with a three wire system, and in which the operation of the battery is controlled by means of a booster.

The principal object of my invention is to provide more efficient and inexpensive means for supplying any unbalance of load on the two sides of the three wire system and for charging one side of the battery more than the other, should the battery become unequally discharged on the two sides.

The general nature and scope of my invention will be more clearly seen from the following description taken in connection with the accompanying drawings, in which—

Figure 1, is an illustration of a system embodying features of the invention, and Fig. 2, is a modification of the system shown in Fig. 1.

In Fig. 1, G, is the main generator connected to the outside wires 1 and 3, of the three wire system, the neutral of the system being the conductor 2. $L^1$ and $L^2$, represent lamps connected to the two sides of the three wire system and this lamp load may be unbalanced. A battery B, is shown connected at its middle point by means of switch $S^5$ to the neutral conductor 2. The terminals of the battery may be connected by means of the double throw switches $S^3$ and $S^4$, either directly to the outside conductors 1 and 3, of the three wire system, or to the boosters $C^1$ and $C^2$. In the position of the switches $S^3$ and $S^4$ shown on the diagram, the boosters $C^1$ and $C^2$, are connected between conductors 1 and 3, and the corresponding terminals of the battery. These boosters as here shown are what are commonly known as constant current boosters, being respectively provided with shunt field windings 4 and 5, and series field windings 6 and 7, the latter being differentially wound with respect to the former. At $L^3$, is shown a fluctuating load connected across the battery terminals and the operation of the boosters $C^1$ and $C^2$, is such as to transmit a practically constant current from the conductors 1 and 3, to the battery terminals, thereby causing the battery to take the fluctuations of the load $L^3$, this being accomplished by reason of the series windings 6, and 7, which act to produce booster voltage in a direction to oppose the flow of current. The operation of these boosters is well known in the art and need not be further described. The boosters $C^1$ and $C^2$, are driven by two motors $M^1$ and $M^2$, the four armatures being mounted on a common shaft H. The motors are connected in series with each other across the outside conductors 1 and 3, and are provided respectively with shunt field windings 8 and 9, controlled by the rheostats $R^1$ and $R^2$. A switch $S^6$, connects a point in the circuit between the two motors to the neutral conductor 2. When thus connected the two motors serve not only to drive the boosters $C^1$ and $C^2$, but act also as a balancing set for supplying any unbalance of load between the two sides of the system. When the switches $S^5$ and $S^6$ are both closed and the switches $S^3$ and $S^4$, are in the position shown on the drawing, one side of the battery may be charged more than the other side by controlling the fields 4 and 5, by means of the rheostats $R^3$ and $R^4$, while at the same time the voltage on the two sides of the three wire system may be maintained equal by means of the rheostats $R^1$ and $R^2$. This will permit equalizing any inequality in the state of discharge of the two sides of the battery which may have been brought about, for example by discharging the battery on the three wire system with unbalanced load when the main generator and booster set are shut down.

The arrangement shown in Fig. 2, differs from that of Fig. 1, by the substitution of field windings 12 and 13, on the boosters $C^1$ and $C^2$, instead of the differential series windings 6 and 7, of Fig. 1. These field windings 12 and 13 are automatically controlled from a common source to maintain constant current in the boosters $C^1$ and $C^2$. The common means of control for the field windings 12 and 13 as here shown, is the carbon regulator D. This consists of two piles of carbon disks $K^1$ and $K^2$, the pressure on which is controlled by a lever pivoted in the middle and acted upon by an adjustable spring O at one end and a solenoid N at the other end, this solenoid being connected into the conductor 10 between the booster $C^1$ and the battery. The two field coils 12 and 13 are connected in parallel between the carbon regulator D and the middle point of the battery. The operation of the carbon regulator is well known in the art, being described in Letters Patent #763,168, granted July 21st, 1904, to Justus B. Entz, and need not be further described herein. It will be seen that the arrangement of the two motors, mechanically connected to each other and electrically connected in series across the outside conductors of the three wire system provides means for accomplishing two results. First, if the switch $S^5$ is opened the two motors provide the point of neutral potential for the three wire system maintaining the desired division of voltage between the two sides and taking care of any unbalance of load, thus permitting the main generator G to be designed for connection across the outside conductors only. Second, with the switch $S^5$ closed, the arrangement permits one side of the battery to be charged more than the other side, thus compensating for any inequality in the condition of the two sides of the battery.

While in the arrangements shown and described the booster set is used for controlling a storage battery, I do not wish to be understood as limiting my invention to a booster thus used, but desire to cover any booster set in which are included two motors connected in series across the outside wires of the three wire system with a connection from a point in circuit between the motors to the neutral of the three wire system.

What I claim is:

1. In combination, a three wire system of electrical distribution having translating devices connected between the outside wires and the neutral wire and other translating devices connected across the outside wires, a storage battery, a booster set including two boosters mechanically connected, appropriate connections between the booster and battery terminals and the three conductors of the system, and means responsive only to the load of the translating devices last mentioned and adapted to control both boosters simultaneously.

2. In combination, a three wire system of electrical distribution having translating devices connected between the outside wires and the neutral wire and other translating devices connected across the outside wires, a storage battery, a booster set including two boosters mechanically connected, appropriate connections between the booster and battery terminals and the three conductors of the system, means responsive only to the load of the translating devices last mentioned and adapted to control both boosters simultaneously, and means for controlling one of the boosters independently of the other.

3. In combination, a three wire system of electrical distribution having translating devices connected between the outside wires and the neutral wire and other translating devices connected across the outside wires, a storage battery, a booster set including two boosters mechanically connected, appropriate connections between the booster and battery terminals and the three conductors of the system, means responsive only to the load of the translating devices last mentioned and adapted to control both boosters simultaneously, a field winding on each booster, and a separate rheostat for each field winding.

4. In combination, a three wire system of electrical distribution having translating devices connected between the outside wires and the neutral wire and other translating devices connected across the outside wires, a storage battery, a booster set including two boosters mechanically connected, appropriate connections between the booster and battery terminals and the three conductors of the system, and a booster regulator responsive only to the load of the translating devices last mentioned and adapted to control both boosters simultaneously.

5. In combination, a three wire system of electrical distribution having translating devices connected between the outside wires and the neutral wire and other translating devices connected across the outside wires, a storage battery, a booster set including two boosters mechanically connected, appropriate connections between the booster and battery terminals and the three conductors of the system, a booster regulator responsive only to the load of the translating devices last mentioned and adapted to control both boosters simultaneously, and means for controlling one of the boosters independently of the other.

6. In combination, a three wire system of electrical distribution having translating devices connected between the outside wires and the neutral wire and other translating devices connected across the outside wires, a storage battery, a booster set including two boosters mechanically connected, appropriate connections between the booster and battery terminals and the three conductors of the system, a booster regulator responsive only to the load of the translating devices last mentioned and adapted to control both boosters simultaneously, a field winding on each booster, and a separate rheostat for each field winding.

In testimony whereof I have hereunto signed my name.

JOSEPH H. TRACY.

Witnesses:
W. J. JACKSON,
FRANK E. FRENCH.